Nov. 27, 1951     C. B. ALBRIGHT     2,576,274
DRYING AND CURING APPARATUS

Filed Oct. 4, 1947     5 Sheets-Sheet 1

INVENTOR
CHARLES B. ALBRIGHT
BY
*Toulmin & Toulmin*
ATTORNEYS

Nov. 27, 1951  C. B. ALBRIGHT  2,576,274
DRYING AND CURING APPARATUS
Filed Oct. 4, 1947  5 Sheets-Sheet 2

INVENTOR
CHARLES B. ALBRIGHT
BY
Toulmin & Toulmin
ATTORNEYS

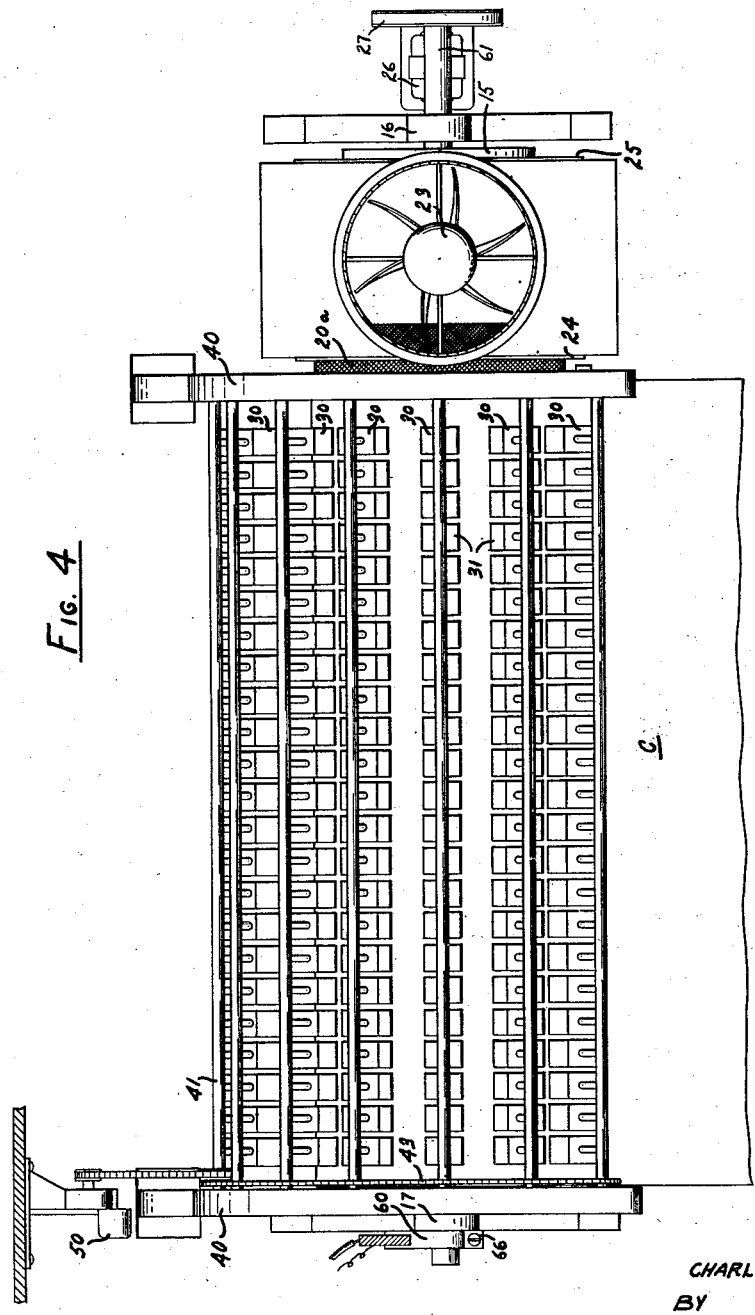

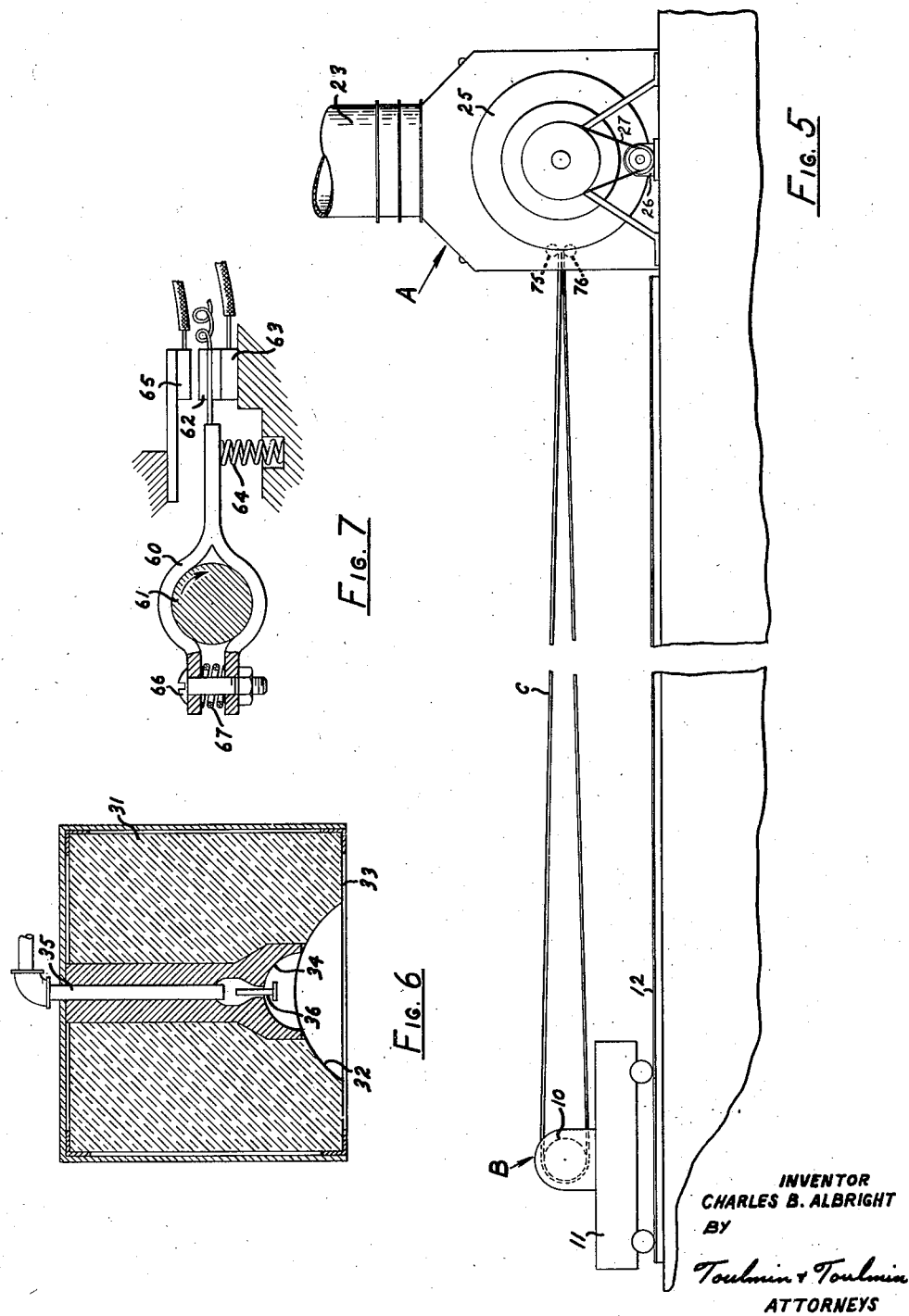

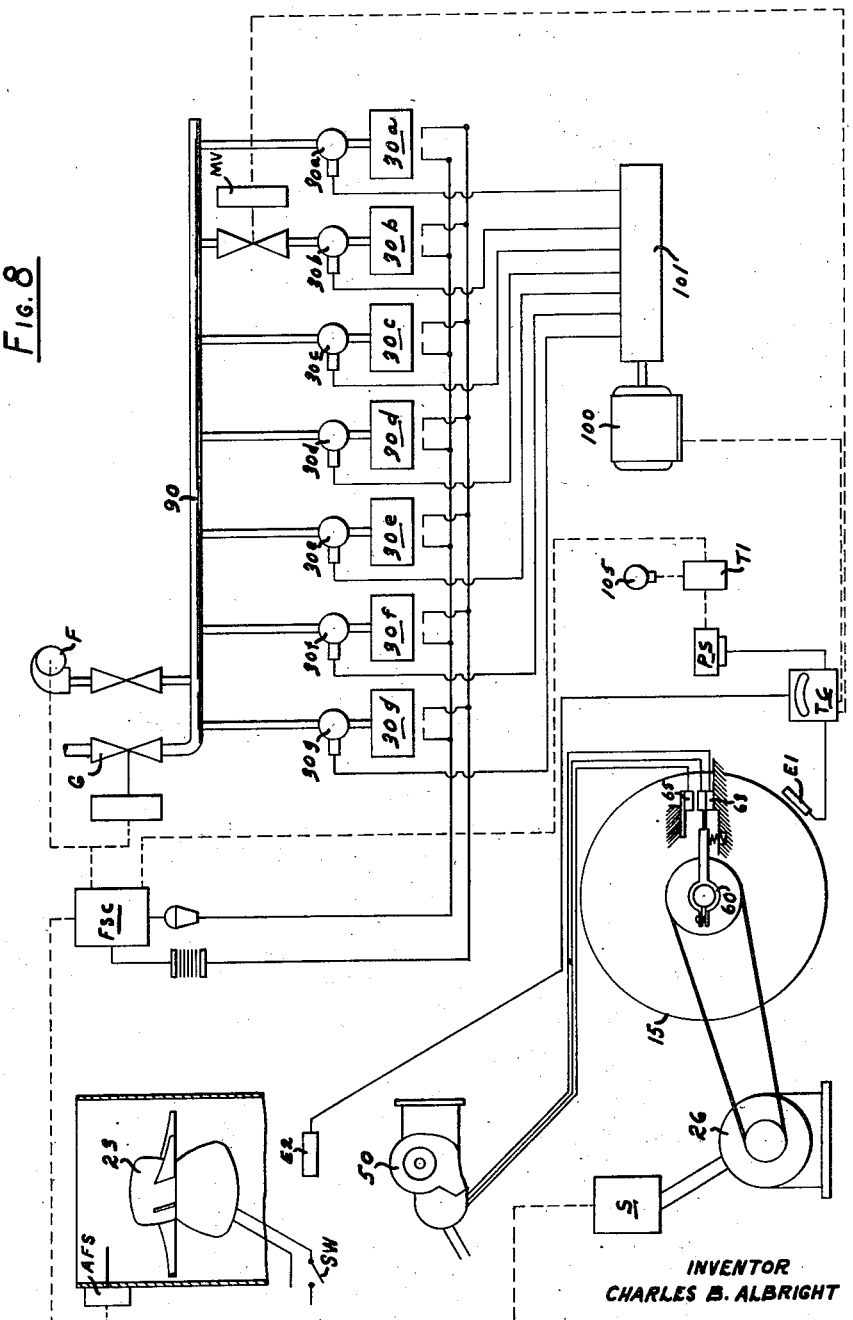

Patented Nov. 27, 1951

2,576,274

UNITED STATES PATENT OFFICE 2,576,274

DRYING AND CURING APPARATUS

Charles B. Albright, New York, N. Y., assignor to The Orr Felt & Blanket Company, Piqua, Ohio, a corporation of Ohio Application October 4, 1947, Serial No. 777,927

12 Claims. (Cl. 34—48)

This invention relates to a method and apparatus for processing wool felts that are adapted for use on papermaking machines, but which can be applied to other uses.

It is common practice in the papermaking industry to use endless belts, or felts, on the papermaking machines in the manufacture of paper, cardboard, asbestosboard and other like materials. These felts are made of wool fibers that are twisted into yarn and suitably woven and subsequently fulled to the proper size. The life of pure wool felts is relatively short.

It has recently been found that by applying certain synthetic resins to the felts after they have been manufactured, and properly curing the resins within the body of the felt, that the life of the felt is greatly increased. However, proper drying and curing of the resins with which the felts are impregnated involves a substantial problem in view of the size of the felts. Also, it is necessary that elevated temperatures be used for the purpose of drying and curing the felts and that a large volume of air be circulated around and through the felt while it is being cured to obtain a uniform cure of the resin throughout the body of the felt.

It has been found that synthetic resins such as the alkylated melamine formaldehyde resins are especially advantageous in prolonging the life of the felts. However, to properly dry the felt after it has been saturated by a solution of the resin, it is necessary that the felt be elevated to a temperature above 200° F., and when the felt has been dried to a predetermined degree of dryness, the resin will be cured at the elevated temperature which may at times increase to as much as 400° F., depending upon the resin being cured.

In general, it has been found preferable to use water solutions of the resins that can be used to prolong the life of the felts. In this event the felt are placed in a suitable container until thoroughly saturated, after which excess resin solution is removed from the body of the felt by any suitable apparatus until the retained resin solution is at a proper percentage of the dry weight of the felt, generally about 57% of the dry weight of the felt. The drying and curing operation follows the removal of excess resin solution to completely polymerize or condense the resin.

It is therefore an object of this invention to provide a method and an improved apparatus for drying and curing a resin-impregnated felt in a continuous process, and to carry forward the process automatically under suitable control.

It is another object of the invention to provide an improved method and apparatus for drying and curing of resin-impregnated felts wherein radiant heat is used for heating the felt and a large volume of air is drawn through the felt to carry the heat uniformly throughout the body of the felt during the drying and curing thereof, and wherein the radiant heat is under automatic control to maintain a uniform temperature condition upon the felt during the drying and curing operation.

It is still another object of the invention to provide an apparatus in which the foregoing object can be accomplished wherein the radiant heat is obtained from gas-fired radiant burners.

It is still another object of the invention to provide an improved and simplified apparatus for the drying and curing of resin-impregnated felts wherein a large volume of fresh air is continuously drawn through the felt to carry heat through the body of the felt and remove moisture therefrom, the air being exhausted after being used, and wherein radiant heat is used for elevating the temperature of the felt to proper drying and curing temperatures.

It is another object of the invention to provide an improved drying and curing drum over which the felt is passed wherein the drum is constructed with a foraminous surface of varying degrees of porosity whereby to control the amount of air passing through the surface of the drum in a substantially uniform manner over the entire surface, and further to arrange the line of division between the various portions of different porosity of the drum surface so as to prevent development of a line on a felt along the lines of separation between portions of the drum of different porosity.

Still another object of the invention is to provide an improved and simplified apparatus for drying and curing felts wherein much of the equipment now used in the plants of felt manufacturers can be utilized, with alteration, in the improved apparatus, thereby greatly reducing equipment expense in the setting up of machinery for the purpose of drying and curing felts that are impregnated with resins.

Further objects and advantages will become apparent from the drawings and the following description.

Figure 4 is a plan view of the apparatus.

Figure 5 is an end elevational view of the drying and curing apparatus of this invention together with apparatus for stretching the felt to its proper length.

Figure 6 is a cross-sectional view through one of the gas-fired radiant burners.

Figure 7 is a somewhat schematic view of part of the electrical controls.

Figure 8 is a schematic view of a control system for automatically controlling the apparatus of this invention.

Figure 1:
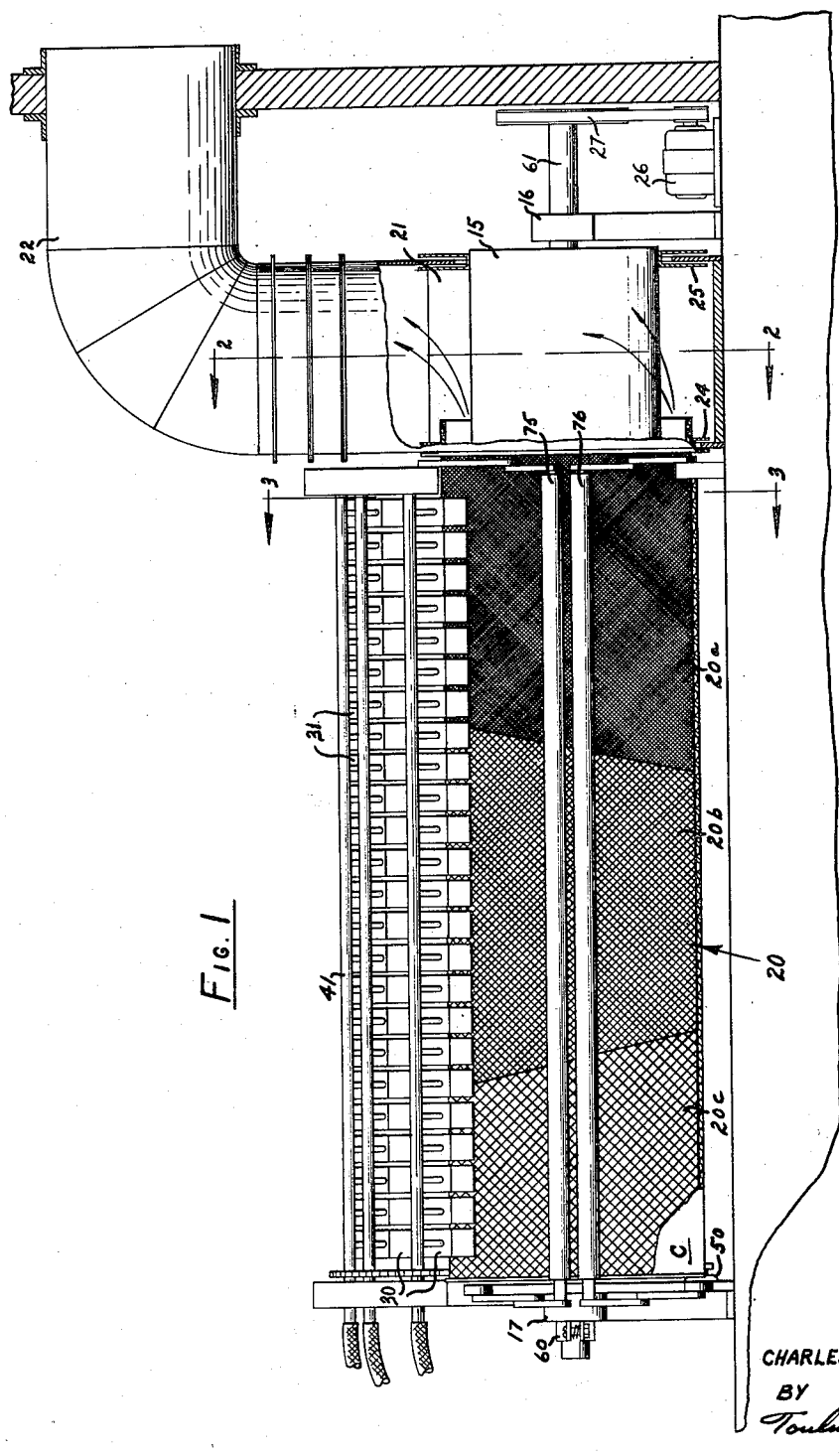
Figure 1 is a front elevational view, partially in cross-section, of apparatus constructed in accordance with this invention.
Figure 2:
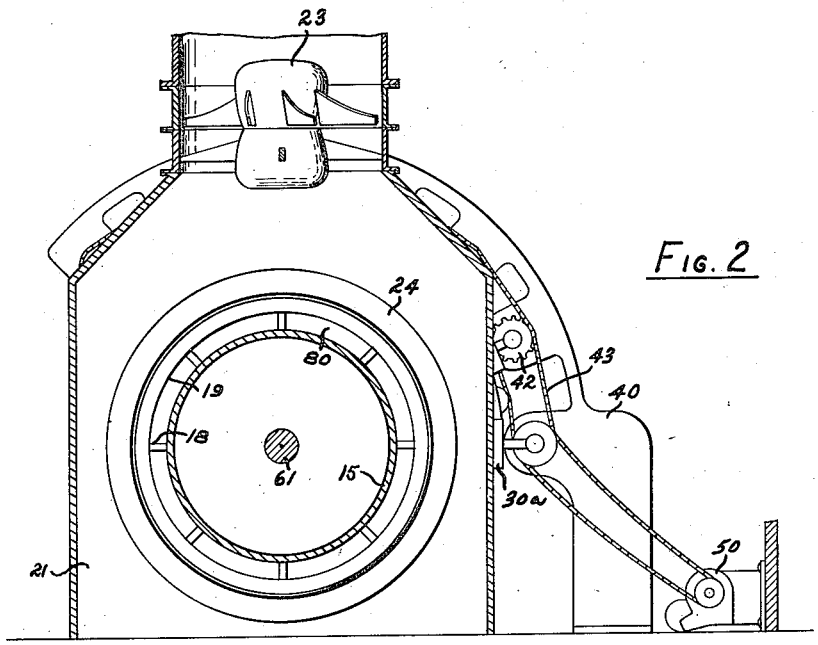
Figure 2 is a vertical cross-sectional view taken substantially along line 2—2 of Figure 1.

The drying and curing apparatus of this invention, as illustrated in Figure 5, consists of a drying and curing apparatus A and a stretching apparatus B. An endless papermaker's felt C is positioned upon the drying and curing apparatus A and over the roll 10 of the stretching apparatus B to stretch the felt C to the proper length.

The roll 10 of the stretching apparatus B is carried upon a cart 11 that moves upon parallel tracks 12 and is retained in its set position by any suitable mechanism.

The drying and curing apparatus A, more particularlly illustrated in Figures 1 to 4, consists of a cylindrical drum 15 that is suitably supported between bearing blocks 16 and 17. A plurality of radially positioned ribs 18 project from the periphery of the drum 15. The ribs 18 support a spirally wound rib 19 that in turn supports a wire mesh screen 20 which forms the supporting surface for the papermaker's felt C during the drying and curing thereof.

The wire mesh screen 20 is composed of screen having a plurality of different size mesh, as illustrated in Figure 1 by the portions designated 20a, 20b and 20c. The mesh screen 20a is the finest of the mesh screen used, the portion 20b is less fine and the portion 20c is the coarsest. The coarsest of the wire screen mesh portions 20a, 20b and 20c has a resistance to the passage of air through it that is greater than the resistance of the heaviest felt that will be processed on the machine, thus insuring passage of air through the felt rather than by-passing of the air around the edge of the felt when a felt of lesser width than the full width of the drum is processed on the machine. The difference in the size of the mesh of the screen insures a substantially uniform flow of air through the entire periphery of the drum, by preventing the suction opening of the end of the drum from drawing entirely upon the screen area closest to it.

It will also be noted that the lines of division between the portions 20a and 20b, and the portions 20b and 20c are angular to a radial plane through the drum 15. This arrangement prevents the development of a definite line on a felt being processed on the machine which would be produced if there was a sharp line of division between the rates of flow of air between two different portions of the felt.

The spirally wound web 19 and the radial webs 18 provide a chamber between the surface of the drum 15 and the foraminous surface 20 formed by the wire screens through which air may be drawn.

One end of the foraminous screen surface 20 enters a plenum chamber 21 that extends around one end of the drum 15. The plenum chamber 21 is connected by means of a duct 22 to an exhaust or discharge of air drawn through the foraminous screen surface 20. An axial flow fan 23 is provided in the duct 22 for drawing air through the foraminous screen surface 20 and discharging the same from the duct 22. Air seals 24 and 25 are provided between the walls of the plenum chamber 21 and the drum 15 and the foraminous screen surface 20 so that all of the air entering the plenum chamber 21 must pass through the foraminous screen surface.

Thus, an endless felt C placed upon the foraminous screen surface 20 will have air from the room in which the apparatus is placed drawn through the felt, which air will be discharged by the fan 23.

The drum 15 and the cylindrical foraminous screen surface 20 carried thereon are rotated by means of the electric motor 26 and the belt drive 27.

Figure 3:
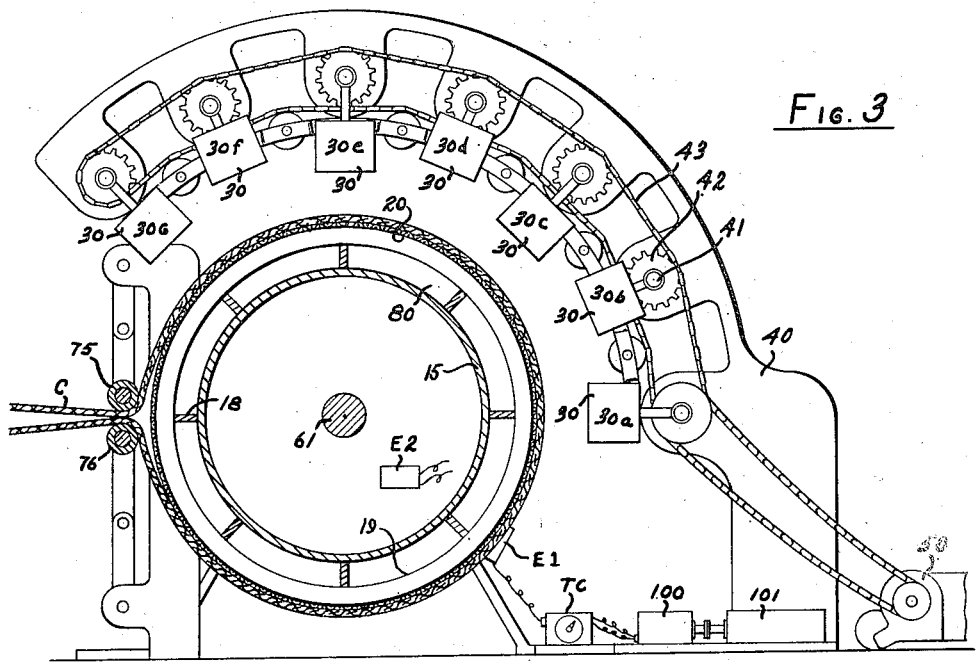
Figure 3 is a vertical cross-sectional view taken along line 3—3 of Figure 1.

For the purpose of elevating the temperature of the felt C to dry the same and to cure a resin retained in the felt, there is provided a plurality of gas-fired radiant heating units 30 positioned radially about the drum 20, as illustrated in Figure 3. Each of the gas-fired heating units is constructed in a manner similar to that disclosed in Figure 6 and consists primarily of a square ceramic block 31. The block 31 is provided with a dish-shaped recess 32 in the face 33 of the block from which extends a second semi-spherical-shaped recess 34. Gas is introduced into the block 31 through the pipe 35 and the gas discharges from the pipe 35 through the burner valve 36, the gas flame remaining substantially within the recess 34. The gas flame within the recesses 34 and 32 will raise the temperature of the surfaces to iridescence, thereby throwing off infrared rays which can be utilized for heating purposes.

The heating units 30 each consist of a plurality of the individual burner blocks 31 that are positioned in side-by-side relationship to form the heating units which extend longitudinally along the drying and curing drum 15, as shown in Figure 4.

The heating units 30 are carried upon a frame 40, each of the heating units being attached to a rotatable shaft 41 that carries a sprocket gear 42. A sprocket chain 43 passes over all of the sprockets 42 so that all of the heating units 30 can be rotated simultaneously to direct their radiant energy away from the surface of the drying and curing drum upon rotation of the heating units either through 90° or 180° of rotation.

It will be noted that the heating units numbered 30a, 30c, 30e and 30g are positioned radially closer to the foraminous screen surface 20 than are the heating units 30b, 30d and 30f. This arrangement is provided so that the heating units 30g, 30e, 30c and 30a may be cut out sequentially in that order as the temperature of the belt on the drying and curing apparatus reaches a predetermined value and tends to rise above that value. Should the temperature of the felt continue to rise the heating units 30f, 30d and 30b may then be cut out in that order to prevent further rise in temperature, the heating unit 30b having a modulating valve on it so that rather than cutting the unit out completely, the gas to the unit will be modulated to at least 50% of the normal heating capacity of the unit.

The heating units 30a to 30g inclusive are adapted to be rotated by means of a motor mechanism 50 which is adapted to rotate the heating units 180° upon energization of the motor unit 50 and will rotate the heating units 30 another 180° upon a second energization of the motor unit 50. This action is obtained in response to the rotation of the drum 15. If the drum 15 should stop for any reason, the controls for the apparatus are so arranged that the motor unit 50 will be operated to rotate the heating units 30 180° and thus turn them away from the felt C upon the surface of the drum and thereby prevent a fire.

Upon the drum 15 again starting, the motor unit 50 will again be actuated to replace the heating units in the position illustrated in Figure 3. The motor unit 50 may take the form of a conventional damper motor that opens and closes the damper of a hot-air furnace, such a motor control for performing various functions being a standard product of American Radiator Company and known as their "Arco Motor Control No. 846." This motor control consists of an electric motor, a train of gears, and a switch mechanism which causes the motor to stop after each half-revolution of the lifting arm. The motor control is operated by a conventional three-wire circuit and is widely used for opening and closing large valves, controlling dampers, or performing various kinds of work where a movement up and down or forward and back is required. The motor valve may be operated by any conventional three-wire circuit in which a circuit is made at each end movement of the controlling device.

The controlling circuit for the motor control 50 consists, in this invention, of a controller diagrammatically illustrated in Figure 7.

The controller consists of a contact arm 60 carried upon the shaft 61 of the drum 15. The arm 60 frictionally engages the shaft 60 so that rotation of the shaft in the direction of the arrow thereon, see Figure 7, will cause the contact arm to move in a clockwise direction to close a circuit through the contacts 62 of the contact arm and the contact member 63. However, when the shaft 61 stops for any reason, the spring 64 will urge the contact 62 into engagement with contact 65, as shown in Figure 7, to close circuit therethrough. Thus, electric circuit can be made alternately through the reversing circuits in the motor control 50. The arm 60 is given proper frictional resistance upon the shaft 61 by means of the screw 66 and the spring 67.

The general operation of the machine is such that an endless papermaker's felt which has been properly treated with a resin solution is placed upon the foraminous wire screen surface 20 of the drying and curing drum, and is placed over the roll 10 of the stretching apparatus B, see Figure 5. Suitable guide rolls 75 and 76 are then brought into the position illustrated in Figure 3 to cause the felt to substantially enclose the periphery of the foraminous screen drum. The drying and curing drum is then rotated by the drive motor 26, the heaters 30 being turned on for the purpose of heating the felt C. The temperature of the felt C is maintained at a predetermined value by controlling the number of heating units 30 that are effective, this being under control of a suitable and conventional program controller which is responsive to the temperature of the felt on the drying and curing drum. Any temperature rise of the felt will cause the program controller to sequentially cut out the heating units in the order previously mentioned with a final modulating control of the last heating unit 30b.

After the felt has passed over the drum for a sufficient period of time, the temperature of the air passing through the felt, as caused by the fan 23, will rise in the chamber 80 between the drum 15 and the foraminous screen drum 20 to a point at which the air temperature in the chamber will be approximately the temperature of the felt, thus indicating that substantially all of the moisture has been removed from the felt. At this time the curing of the felt is indicated to start, a suitable timing mechanism being provided to establish the curing period after which the heating units will be cut off.

After a desired cooling period, the felt may be removed from the drying and curing drum.

The controls for producing an automatic cycle of operation of the machine heretofore described are diagrammatically illustrated and are inter-connected diagrammatically in Figure 8 to illustrate the general functioning of the controls.

In so far as the controls themselves are concerned, they are of a type known as air-actuated controls, and specifically, the individual controls are manufactured by the Minneapolis-Honeywell Regulator Company, Brown Instruments Division, and are standard air-actuated controls of this company. Therefore, the hook-up of the various controls is illustrated only diagrammatically to establish the functioning of the various controls with regard to their effect one upon the other as applied to the functions they produce in controlling the apparatus of this invention. However, the controls per se do not constitute any part of this invention.

The functioning of the entire system is made dependent on the operation of the axial fan 23, which must be operating before the remaining controls can be rendered effective. This is to insure movement of air through a felt placed on the drying and curing drum before any heat is applied to the felt. When the axial fan is operating an air-flow switch AFS is closed to render a starter S for the motor 26 effective to thereby start the motor and cause the drum 15 to rotate. Rotation of the drum 15 will place the heating units 30 in the position illustrated in Figure 3 as heretofore described through operation of the motor control 50.

The air-flow switch AFS also renders the flame safety control FSC active for the purpose of opening the gas valve G and starting the fan F which supplies air into the main gas-line 90. If the flame safety control FSC is satisfied by ignition of all of the heating units, the heating units will be active upon the felt for the drying and curing operation. However, if one of the heating units should not ignite, the flame safety control will close the gas valve G after a predetermined time and thereby shut down all of the heating units.

A temperature controller TC has one heat-responsive element $E_1$ responsive to the temperature of the felt, and a second temperature responsive element $E_2$ responsive to the temperature of the air drawn through the felt. The temperature controller TC operates the motor 100 of a program controller 101 which may consist of a conventional electric switching mechanism having sequentially operated switches. The program controller 101 controls solenoid valves 30a, 30b, 30c, 30d, 30e, 30f and 30g controlling the respective heating units 30a to 30g respectively so that the heating units can be cut out in the sequence heretofore described in accordance with rising temperature of the felt on the drying and curing room.

The temperature controller TC further regulates a modulating valve MV to modulate the gas flow into the heating units 30b as heretofore described.

As the drying of the felt progresses and the moisture content of the felt is reduced, the temperature of the air being exhausted by the axial fan 23 increases until it projects approximately the temperature of the felt, thus driving the temperature-sensitive devices $E_1$ and $E_2$ into substantial equality. At this time the temperature controller TC operates a pressure switch PS which in turn operates a timer $T_1$. When the timer $T_1$ is rendered effective, an alarm 105 is sounded indicating the beginning of the curing cycle, whereafter upon the running of the timer, it will cause the flame safety control to function to close the gate valve G and shut off all heating units and thereby stop the curing cycle after a predetermined time. The axial fan 23 will continue to operate to cool the apparatus and the felt until the switch SW is opened manually, or this function may be taken over automatically by a second timer which is rendered effective by the timer $T_1$ at the close of the curing cycle. When the fan 23 is stopped, the entire system is rendered ineffective and the dried and cured felt may then be removed from the drying and curing drum.

While the apparatus disclosed and described herein constitutes a preferred form of the invention, yet it will be understood that modifications that fall within the scope of the appended claims are intended to be included herein.

Having thus fully described my invention, what I claim as new and desire to secure by Letters Patent is:

1. An apparatus for processing felts consisting of, a rotatable wire mesh drum exposed to normal room air conditions and having areas of increasing porosity from one end to the other to cause substantially uniform air movement through the entire surface of the drum, a chamber having a suction fan therein at one end of said drum, said drum having the end thereof of minimum porosity connected with said chamber, whereby air is drawn through the foraminous surface of the drum and through a felt placed thereon uniformly, and radiant heating means extending longitudinally of the drum and spaced therefrom to heat a felt placed on the drum.

2. An apparatus for processing felts consisting of, a rotatable wire mesh drum exposed to normal room air conditions, a chamber having a suction fan therein at one end of said drum and communicating with the interior thereof for drawing air through the foraminous surface of the drum, a plurality of radiant heating units extending longitudinally of said drum and spaced radially therefrom for heating a felt placed on the drum, means rotatably mounting each of said heating units for placing them in active heating position relative to the surface of said drum or in inactive heating position, and control means connected with said heating units and actuated in response to rotation or non-rotation of said drum to rotate said heating units into active or inactive position respectively.

3. An apparatus for processing felts consisting of, a rotatable wire mesh drum exposed to normal room air conditions, a chamber having a suction fan therein at one end of said drum and communicating with the interior thereof for drawing air through the foraminous surface of the drum, a plurality of radiant heating units extending longitudinally of said drum and spaced radially therefrom for heating a felt placed on the drum, said heating units being positioned alternately at different spaced distances around said drum, control means connected with said heating units rendering said heating units active or inactive including control means rendering the heating units nearest the surface of the drum inactive sequentially and thereafter rendering the heating units farthest from the surface of the drum inactive sequentially, and further including control means modulating the effect of the last of said heating units before rendering it ineffective.

4. An apparatus for processing felts consisting of, a rotatable wire mesh drum exposed to normal room air conditions, a chamber having a suction fan therein at one end of said drum and communicating with the interior thereof for drawing air through the foraminous surface of the drum, a plurality of radiant heating units extending longitudinally of said drum and spaced radially therefrom for heating a felt placed on the drum, said heating units being positioned alternately at different spaced distances around said drum, and control means connected with said heating units rendered active in response to a temperature rise of a felt processed on said drum rendering said heating units active or inactive including control means rendering the heating units nearest the surface of the drum inactive sequentially and thereafter rendering the heating units farthest from the surface of the drum inactive sequentially.

5. An apparatus for processing felts consisting of, a rotatable wire mesh drum exposed to normal room air conditions, a chamber having a suction fan therein at one end of said drum and communicating with the interior thereof for drawing air through the foraminous surface of the drum, a plurality of radiant heating units extending longitudinally of said drum and spaced radially therefrom for heating a felt placed on the drum, said heating units being positioned alternately at different spaced distances around said drum, control means connected with said heating units rendered active in response to a temperature rise of a felt processed on said drum rendering said heating units active or inactive including control means rendering the heating units nearest the surface of the drum inactive sequentially and thereafter rendering the heating units farthest from the surface of the drum inactive sequentially, and further including control means modulating the effect of the last of said heating units before rendering it ineffective.

6. An apparatus for processing felts consisting of, a rotatable foraminous drum, a chamber having a fan therein at one end of said drum for withdrawing air therefrom and thereby cause air to move through the surface of said foraminous drum, and a plurality of rows of radiant heating units extending longitudinally along said drum and spaced radially therefrom, alternate rows of said heating units being spaced from the surface of the drum on one of two different distances to render a different heating effect by said alternate rows of heating units.

7. An apparatus for processing felts consisting of, a rotatable foraminous drum, a suction chamber at one end of said drum for withdrawing air therefrom and thereby cause air to move through the surface of said foraminous drum, a plurality of rows of radiant heating units extending longitudinally along said drum and spaced radially therefrom, alternate rows of said heating units being spaced from the surface of the drum on one of two different distances to render a different heating effect by said alternate rows of heating units, control means for individually controlling each of the rows of heating units to render the same active or inactive, and control means actuated in response to the temperature of a felt processed on said drum to render said heating units on a radii closest to said drum inactive sequentially and thereafter render the heating units on a radii further from the drum ineffective sequentially.

8. An apparatus for processing felts consisting of, a rotatable foraminous drum, a suction chamber at one end of said drum for withdrawing air therefrom and thereby cause air to move through the surface of said foraminous drum, a plurality of rows of radiant heating units extending longitudinally along said drum and spaced radially therefrom, alternate rows of said heating units being spaced from the surface of the drum on one of two different distances to render a different heating effect by said alternate rows of heating units, control means for individually controlling each of the rows of heating units to render the same active or inactive, and control means actuated in response to the temperature of a felt processed on said drum to render said heating units on a radii closest to said drum inactive sequentially and thereafter render the heating units on a radii further from the drum ineffective sequentially with modulated control on the last effective heating unit.

9. An apparatus for processing felts consisting of, a rotatable foraminous drum, a suction air chamber at one end of said drum and communicating with the interior thereof to draw air through the foraminous surface of said drum, said foraminous surface of said drum being divided into a plurality of areas having different resistances to the passage of air through the foraminous surface, said resistances reducing toward the end of the drum farthest from said air chamber to obtain a relatively uniform movement of air through the entire surface and throughout the length of said drum, and a plurality of heating units extending longitudinally of the drum and spaced radially therefrom for heating a felt placed on the drum.

10. An apparatus for processing felts consisting of, a rotatable foraminous drum, a suction air chamber at one end of said drum and communicating with the interior thereof to draw air through the foraminous surface of said drum, said foraminous surface of said drum being divided into a plurality of areas having different resistances to the passage of air through the foraminous surface, said resistances reducing toward the end of the drum farthest from said air chamber to thereby obtain a relatively uniform movement of air over the entire surface and throughout the length of said drum, the lines of demarcation between areas of different resistance being disposed angularly to a true radial plane through said drum, and a plurality of heating units extending longitudinally of the drum and spaced radially therefrom for heating a felt placed on the drum.

11. An apparatus for processing felts consisting of, a wire mesh drum, an air suction chamber at one end of said drum to draw air through the surface of the same, the wire mesh forming said drum having a decreasing resistance to the passage of air therethrough as the length of the drum increases from said air chamber to thereby obtain a relatively uniform flow of air through the entire surface of said drum, and a plurality of heating units extending longitudinally along said drum and spaced radially therefrom to heat a felt placed on the drum.

12. An apparatus for processing felts consisting of, a wire mesh drum, an air suction chamber at one end of said drum to draw air through the surface of the same, the wire mesh forming the surface of said drum being divided into a plurality of areas of different resistance as the distance of said areas increases from said air chamber, the lines of demarcation between areas of different resistance being positioned angularly to a true radial plane through said drum, and a plurality of heating units extending longitudinally along said drum and spaced radially therefrom to heat a felt placed on the drum.

CHARLES B. ALBRIGHT.

REFERENCES CITED

The following references are of record in the file of this patent:

UNITED STATES PATENTS

| Number | Name | Date |
|---|---|---|
| 776,197 | Nistle | Nov. 29, 1904 |
| 1,427,437 | Breuer | Aug. 29, 1922 |
| 1,707,547 | Adams | Apr. 2, 1929 |
| 1,796,198 | Gehnrich | Mar. 10, 1931 |
| 1,986,548 | Wolff | Jan. 1, 1935 |
| 2,101,301 | Wellmar | Dec. 7, 1937 |
| 2,113,770 | Richardson | Apr. 12, 1938 |
| 2,127,956 | Helmer | Aug. 23, 1938 |
| 2,249,179 | Schur | July 15, 1941 |
| 2,252,181 | Hunter et al. | Aug. 12, 1941 |
| 2,308,239 | Bell | Jan. 12, 1943 |
| 2,355,391 | Nelson | Aug. 8, 1944 |
| 2,429,338 | Adams | Oct. 21, 1947 |
| 2,445,443 | Long | July 20, 1948 |

FOREIGN PATENTS

| Number | Country | Date |
|---|---|---|
| 393,417 | Great Britain | June 8, 1933 |